July 5, 1932.  H. C. BOSTWICK  1,865,669
METHOD AND APPARATUS FOR SPLICING UNVULCANIZED INNER TUBES
Filed Nov. 27, 1928   2 Sheets-Sheet 1
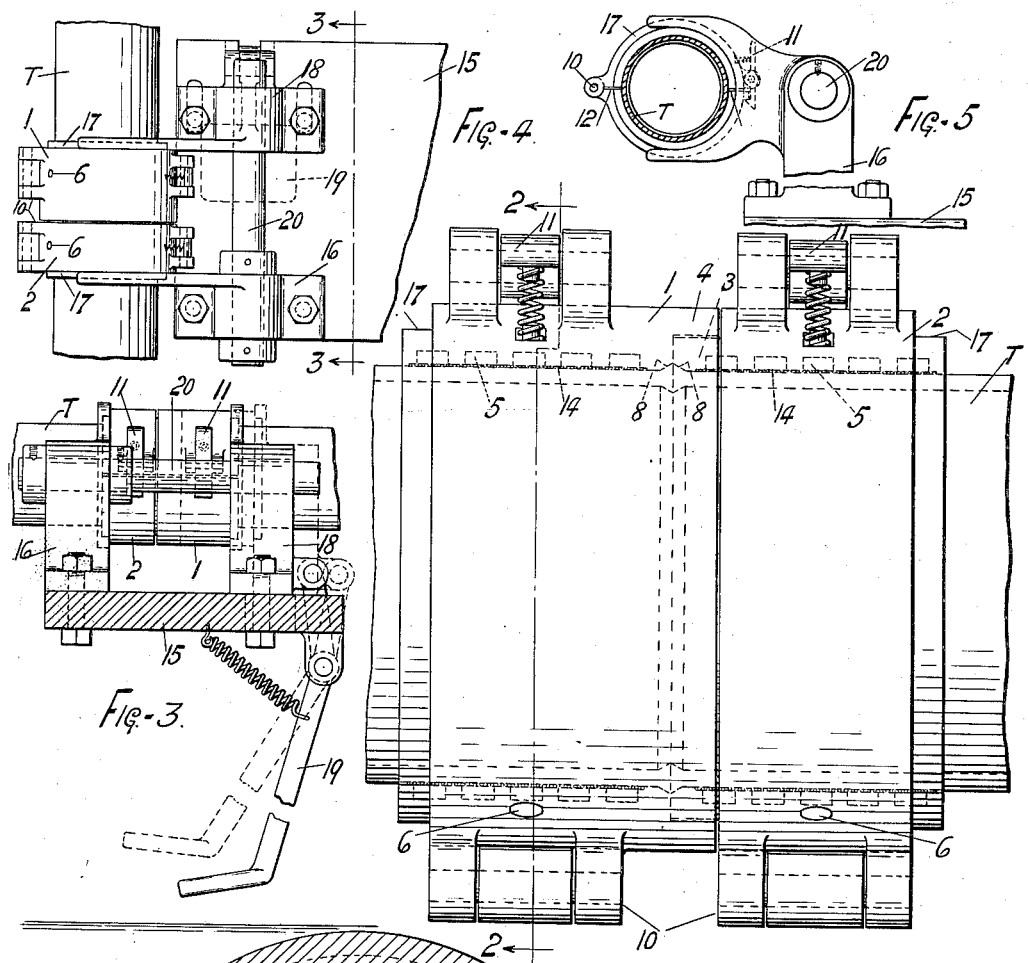
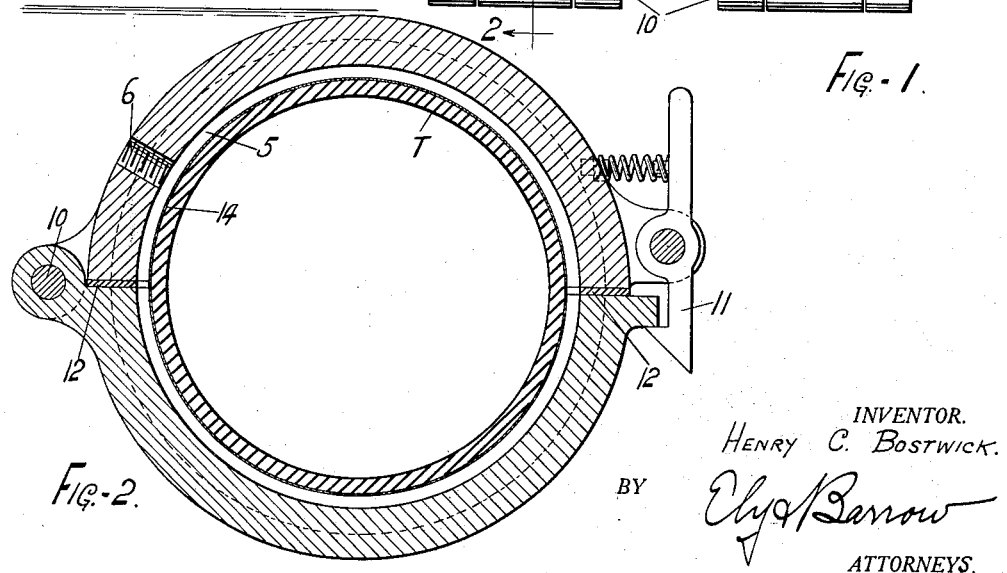
INVENTOR.
HENRY C. BOSTWICK.
BY
ATTORNEYS.

July 5, 1932.   H. C. BOSTWICK   1,865,669
METHOD AND APPARATUS FOR SPLICING UNVULCANIZED INNER TUBES
Filed Nov. 27, 1928   2 Sheets-Sheet 2

INVENTOR.
HENRY C. BOSTWICK.
BY
ATTORNEYS.

Patented July 5, 1932

1,865,669

UNITED STATES PATENT OFFICE

HENRY C. BOSTWICK, OF KENMORE, OHIO, ASSIGNOR TO THE AKRON STANDARD MOLD COMPANY, OF AKRON, OHIO, A CORPORATION OF OHIO

METHOD AND APPARATUS FOR SPLICING UNVULCANIZED INNER TUBES

Application filed November 27, 1928. Serial No. 322,148.

The present invention relates to the manufacture of inner tubes or similar articles and particularly to the preparation of unvulcanized tubes for curing in molds under internal pressure.

In the manufacture of tubes by this method, it is customary in many factories to make a tube of unvulcanized rubber and then to make an endless tube by joining or splicing the ends, and subsequently curing the tube. The present invention has for its object the provision of more efficient and quicker methods of forming the joint or splice. It also has the advantage of forming a joint in the tube without objectionable or excessive ridges or thickened places at the splice in the completed tube.

The invention has other objects and advantages as will be apparent to those skilled in this art, which will be evident from an understanding of the invention as set forth herein and as defined in the claims. It will be understood that changes and modifications may be made in specific embodiments of the invention within the scope thereof as set forth in the claims.

In the drawings, in which the preferred form of the invention as now known is shown:

Figure 1 is a plan view of the device showing the ends of an unvulcanized tube being joined or spliced;

Figure 2 is a section on the line 2—2 of Figure 1;

Figure 3 is a side view showing the means to be employed for moving or forming the two ends of the tube together, taken on the line 3—3 of Figure 4;

Figure 4 is a plan view of the parts shown in Figure 3;

Figure 5 is a detail of a bracket shown in Figure 4;

Figure 6:
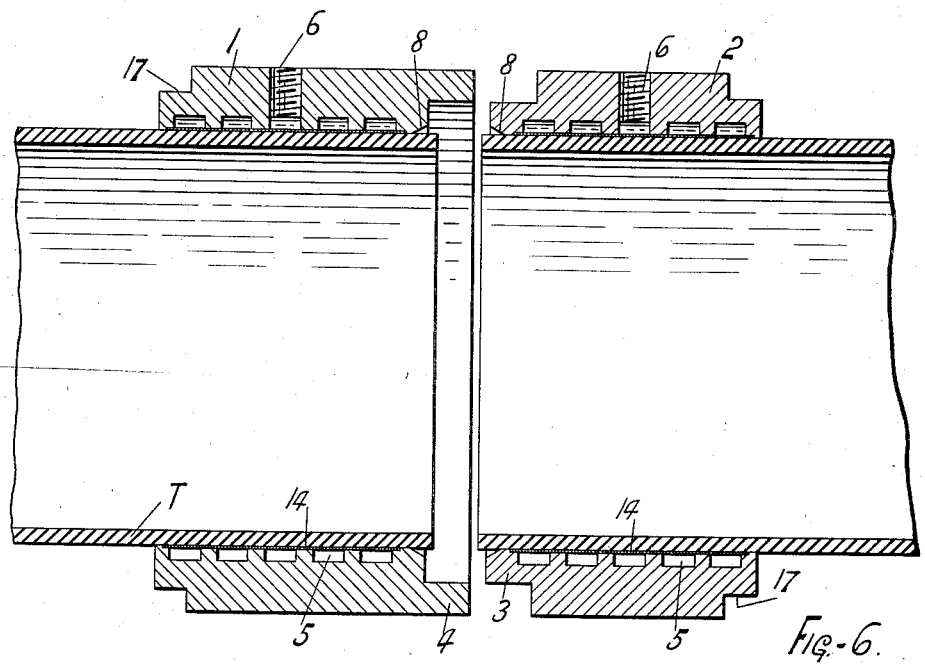
Figure 6 is an enlarged longitudinal section showing the ends of the tube spaced apart.

The apparatus comprises a female ring 1 and a male ring 2, the latter having a reduced extension 3 adapted to enter within a flange 4 on the female ring. Each of these rings is closed on its exterior surface and is provided upon its interior surface, which is of a diameter equal to the diameter of the green or unvulcanized tube, with recesses shown as a plurality of communicating passageways 5, which are covered with a fine mesh screen 14, preferably of brass.

Figure 7:
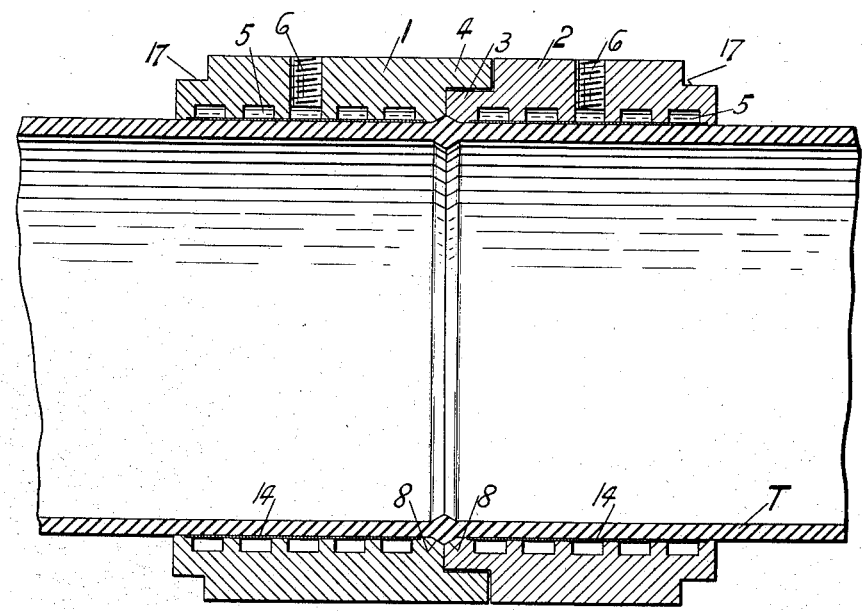
Figure 7 is a similar view showing the parts brought together.

Each ring is provided with a port 6 for connection with a reduced pressure or vacuum line, any suitable piping and valve mechanism (not shown) being provided, under the control of the operator, by which the interior of the rings can be connected to the vacuum. The meeting edges of the two rings are formed with beveled surfaces 8 which form a groove about the rings when the parts are brought together, as shown in Figure 7. Each ring is expansible, being jointed, for example, by the hinge 10 and is arranged to be locked by a suitable catch 11. Gaskets 12 are provided, sealing the joints thus formed.

The ends of the green inner tube T are placed within the rings. The rings are closed and the ends of the tube expanded or rounded out into proximity with the interior surfaces of the rings. The interior surfaces of the ring are then connected with the source of vacuum or reduced pressure and the ends of the tube are thereby distended and firmly held against the inner surfaces of the rings. In locating the tube, each end thereof should project slightly beyond the end of the ring.

With the tubes held in the manner described, the two rings are forced together so that the soft, sticky surfaces of the tube are crowded together so that they will adhere, the protruding ends of the tubes mashing or flattening out, as shown in Figures 1 and 7. The rubber forming the tubes is usually sufficiently soft and tacky to make the splicing operation possible without further preparation, but if the rubber is dry and not sufficiently sticky, it may be moistened or softened by gasoline or some other solvent just before the splicing operation. After the splicing operation is completed, the rings are expanded to remove them from the tube.

In order to force the ends of the tube together, a suitable and practicable apparatus has been illustrated. For this purpose a table or stand 15 is provided to which is affixed a bracket 16 having a forked end to receive the male ring 2, the ring being cut away as at 17 to provide the seat and shoulder for the bracket. A second bracket 18, similarly seated on the female ring, is also provided, this bracket being mounted so that it may shift toward and from the fixed bracket. The bracket may be moved by a foot treadle 19 mounted on the table. A guide rod 20 fixed to one of the brackets and slidable in the other guides the two brackets in their movement and insures the proper cooperation of the two rings and alignment of the edge of the tube.

The mechanism as shown and described is by way of example only and as illustrating a practicable means for mounting the rings and forcing them together. The method of splicing the tubes may be carried out in various ways as will be readily appreciated, and while specifically intended for splicing green or unvulcanized tubes, it may be extended to other operations in the building of tubes or the like. The degree of vacuum to be employed may be varied to accomplish the desired result.

What is claimed is:

1. An apparatus for joining the ends of unvulcanized tubes, comprising cooperating male and female holders for surrounding the ends of the tube, means for applying a vacuum to the interior surfaces of the holders whereby the tube is securely held therein, and means for forcing said holders into cooperating relation to unite the ends of the tube.

2. An apparatus for joining the ends of unvulcanized tubes, comprising a pair of holders movable toward and from one another, each holder being provided upon its inner surface with a recess, means to connect the recess with a source of reduced pressure, each of said holders comprising a fixed section and a movable section hinged to said fixed sections and a latch for locking said sections together, whereby the tube may be inserted and removed laterally of the holders.

3. The method of joining the ends of soft, tacky rubber tubes, comprising supporting the ends of the tube with the edges thereof exposed and forcing the edges together in a butt joint without waste in a direction parallel to the axis of the tube under sufficient pressure to cause the edges to adhere about the entire periphery of the tube.

4. The method of joining the ends of soft, tacky rubber tubes, comprising applying reduced pressure about the outer surface of the ends of the tube and leaving the inner surface exposed to the atmosphere whereby the tube is held in expanded condition, aligning the edges of the ends of the tube, and forcing the edges together in a direction parallel to the axis of the tube.

HENRY C. BOSTWICK.